United States Patent Office 2,749,177
Patented June 5, 1956

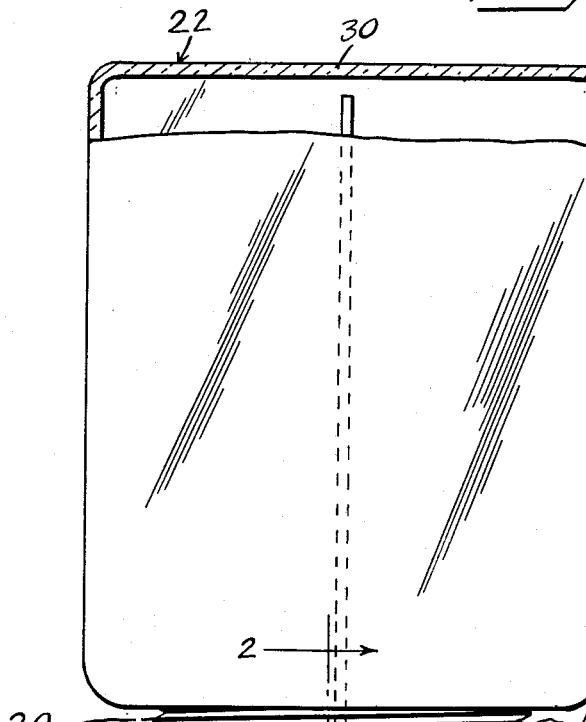
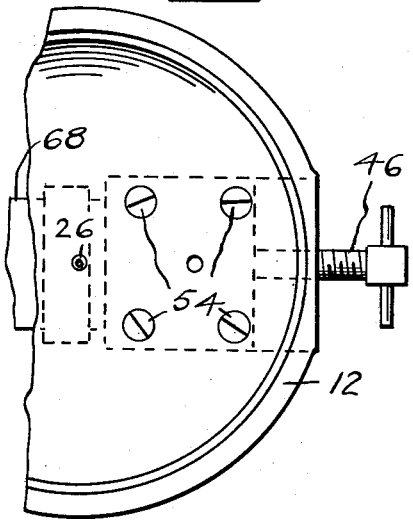
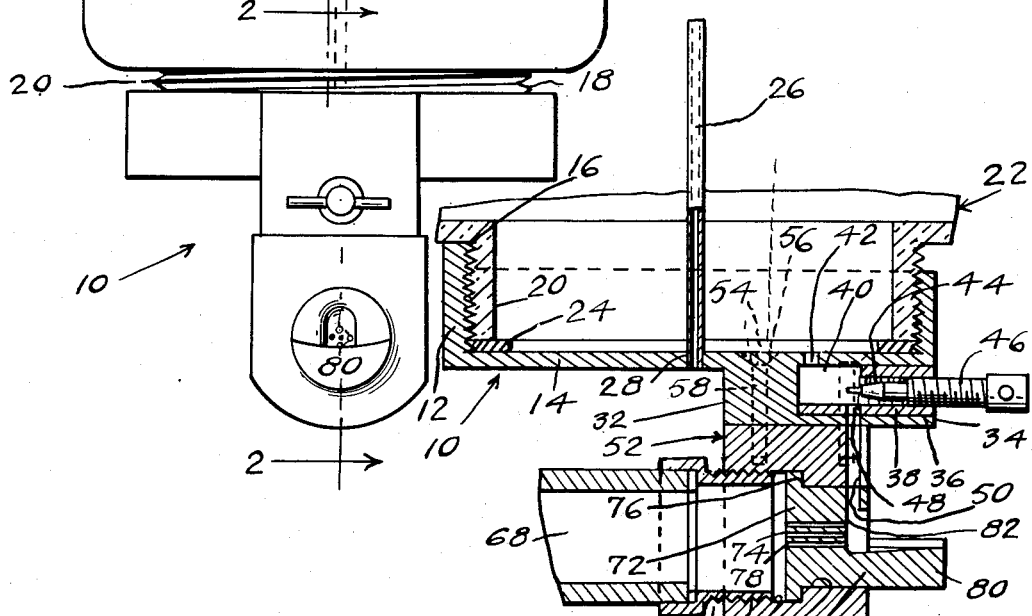

2,749,177

SPRAYING DEVICE

John A. Dean, Portland, Oreg.

Application October 12, 1954, Serial No. 461,843

3 Claims. (Cl. 299—84)

This invention relates to a spraying device, and, more specifically, the invention pertains to a spraying mechanism especially designed for use in the spraying of liquid plant food.

One of the primary objects of this invention is to provide a liquid plant food spraying device with control means for regulating the amount of liquid plant food which is to be admixed with water under pressure to form a liquid plant food compound.

Another object of this invention is to provide a liquid plant food spraying device with nozzle means adapted for connection with a source of water under pressure, and a valve-controlled conduit in aspirating relationship with the nozzle for mixing the liquid plant food with water.

A further object of this invention is to provide a liquid plant food spraying device which is inexpensive to manufacture and assemble, non-complex in construction and design, and durable in use.

Other and further objects and advantages of the present invention will become more evident from a consideration of the following specification when read in conjunction with the annexed drawings, in which:

Figure 1 is a side elevation of a liquid plant food spraying device constructed in accordance with the teachings of this invention.

Figure 2 is an enlarged cross-sectional view taken on the vertical plane of line 2—2 of Figure 1, looking in the direction of the arrows.

Figure 3 is an enlarged partial end elevation of the device shown in Figure 1.

Referring now more specifically to the drawings, reference numeral 10 designates, in general, a liquid plant food spraying device constructed in accordance with the teachings of the present invention. The spraying device 10 comprises a cylindrical member 12 having an end wall 14 extending across one end thereof. The inner side of the cylindrical member 12 is provided with a plurality of threads 16, which are adapted to threadedly engage threads 18 formed on the reduced neck portion 20 of a transparent container or bottle indicated at 22. In order to effect a liquid-tight connection between the cylindrical member 12, the end wall 14 and the neck 20 of the bottle 22, a sealing ring or gasket 24 is interposed therebetween.

Substantially centrally of the end wall 14, an elongated vertical conduit 26 has the lower end thereof disposed within an opening 28 which extends transversely through the end wall 14, the other end of the conduit 26 terminating adjacent the upper end wall 30 (as seen in Figure 1) of the container 22.

A substantially rectangular boss 32 is integrally formed with and projects from the end wall 14, and the boss is offset with respect to the end wall. The outer end 34 of the boss 32 is provided with a planar face which facilitates the boring of an elongated passage 36 inwardly therefrom. An elongated sleeve 38 is fixedly secured within the passage 36 and is provided with a slot or opening 40 which is adapted to communicate with one end of an offset opening 42 which extends transversely through the end wall 14. The other end of the opening 42 is in open communication with the neck 20 of the container 22.

The sleeve 38 is internally threaded at 44 in order to receive an elongated externally threaded valve element 46 which is adapted to be moved axially across an opening 48 formed in the sleeve 38. The opening 48 is aligned with a passage 49 formed in the boss 32, and the latter is, in turn, aligned with a passage 50 which extends through one end of a substantially rectangular nozzle support member 52 adjacent the forward end thereof. A plurality of elongated bolts 54 extend through countersunk openings 56 formed in the end wall 14 and which are aligned with passages 58 which, in turn, traverse the boss 32 and communicate with internally threaded passages 60 formed in the nozzle support, in which the bolts 54 are threaded to secure the nozzle support member fixedly to the boss 32.

The nozzle supporting member 52 is provided with a circular recess 62 which extends inwardly from the other end thereof and is internally threaded at 64 to receive a male connector 66 for a water hose 68. The inner end of the recess 62 is in open communication with the inner end of a cylindrical bore 70 having a reduced diameter and which opens at its other end in the first mentioned end of the nozzle support 52 referred to above. The bore 70 is adapted to receive a substantially cylindrical nozzle 72 having an enlarged flange 74 at the inner end thereof adapted to engage against the annular shoulder 76 and is clamped tightly thereagainst by the inner end of the male connector 66.

The nozzle 72 is provided with a plurality of spaced, substantially parallel water discharge passages 78 which are centrally disposed and parallel with respect to the longitudinal axis of the nozzle.

As is seen in Figures 1 and 2 of the drawing, the nozzle 72 is provided with a lip 80 which projects forwardly beyond the adjacent end of the nozzle support 52, and the inner end of the lip 80 is positioned immediately below a discharge passage 82 which is aligned with the passage 50 formed in the nozzle support 52.

In operation, the container 22 is filled with liquid plant food to the extent that, when the container 22 is inverted to the position shown in Figure 1, the upper end of the conduit 26 will be disposed above the liquid level. The hose 62 is connected with the spraying device 10 and water under pressure is forced through the water discharge passages 78 in spray form. The valve element 46 is then rotated, causing it to move outwardly away from the sleeve 38 to uncover the inner end of the opening 48, to permit the liquid plant food to pass through the opening 42, the opening 48, the passages 50 and 82, to become intermingled with the spray from the discharge passages 78. The controlled flow of liquid plant food to the nozzle 72 is aspirated to some extent due to the proximity of the outer end of the passage 82 with respect to the discharged water spray.

When it is desired to spray without using the liquid plant food, it is merely necessary for the operator to revert the container 22 from the position shown in Figure 1, thereby preventing the liquid plant food from passing through the opening 42.

Having described and illustrated one embodiment of this invention, it will be understood that the same is offered merely by way of example, and that the invention is to be limited only by the scope of the appended claims.

What is claimed is:

1. A spray device for liquid plant food comprising an elongated substantially cylindrical container having an open end, a substantially cylindrical closure member for said container, said cylindrical closure member including an end wall, an elongated substantially centrally positioned tubular member having an end connected with said end wall and extending transversely therethrough, the other end of said tubular member terminating adjacent the closed end of said container, said end wall having an exteriorly positioned enlarged and substantially rectangular boss integrally formed therewith, a substantially enlarged rectangular nozzle support member detachably secured to said boss, a nozzle releasably secured within said nozzle support, means for connecting a source of water under pressure with inlet side of said nozzle, a conduit extending through said end wall and said boss adjacent the other end of said nozzle support for discharging said liquid plant food into the stream of water discharged from said nozzle, and means for controlling the flow of said liquid plant food through said conduit.

2. A liquid plant food spraying device comprising an elongated substantially cylindrical container having opposed open and closed ends, a closure member mounted on said container and extending across said open end, said closure member having a centrally positioned aperture extending transversely therethrough, an elongated tubular member having one end thereof fixedly secured within said opening and its other end terminating adjacent said closed end of said container, said closure member having an offset, enlarged and substantially rectangular boss formed exteriorly thereof, a substantially rectangular nozzle support member releasably secured on said boss, said nozzle support member having an internally threaded opening extending inwardly from a side thereof and adapted for connection with one end of a flexible conduit connected with a source of water under pressure, said nozzle support having a bore extending inwardly from the other side thereof and communicating at its other end with said last named opening, said bore and said last named opening being coaxially aligned, a substantially cylindrical nozzle releasably mounted in said bore and having a lip portion extending beyond said other end of said nozzle support, a plurality of spaced parallel water discharge passages formed in said nozzle and positioned substantially parallel to the longitudinal axis thereof, fluid passage means extending through said closure member, said boss and said nozzle support member, said fluid passage means having a discharge opening adjacent the discharge side of said nozzle, and valve control means interposed in said fluid passage means for controlling the flow of liquid therethrough.

3. A spray device for liquid plant food comprising a container having an open end, a closure member for said container, said closure member including an end wall, a conduit having an end connected with said end wall and extending transversely therethrough, the other end of said conduit terminating adjacent said closed end of said container, said end wall having an exteriorly positioned boss secured thereto, a nozzle support member detachably secured to said boss, a nozzle releasably secured within said nozzle support, means for connecting a source of water under pressure with the inlet side of said nozzle, a second conduit extending through said end wall and said boss adjacent the other end of said nozzle support for discharging said liquid plant food into the stream of water discharged from said nozzle, and means for controlling the flow of said liquid plant food through said second conduit.

References Cited in the file of this patent

UNITED STATES PATENTS

| 867,806 | Ditchfield | Oct. 8, 1907 |
| 2,050,522 | Evans | Aug. 11, 1936 |
| 2,606,068 | Bonacor | Aug. 5, 1952 |

FOREIGN PATENTS

| 150,596 | Australia | Mar. 24, 1953 |